(12) United States Patent
Meyers et al.

(10) Patent No.: US 7,898,462 B2
(45) Date of Patent: Mar. 1, 2011

(54) MULTI-SECTOR RADAR SENSOR

(75) Inventors: David W. Meyers, Brooklyn Park, MN (US); Long Bui, Palos Verde Estates, CA (US); Yi-Chi Shih, Palos Verde Estates, CA (US)

(73) Assignee: Honeywell International Inc., Morristown, NJ (US)

(*) Notice: Subject to any disclaimer, the term of this patent is extended or adjusted under 35 U.S.C. 154(b) by 134 days.

(21) Appl. No.: 12/245,593

(22) Filed: Oct. 3, 2008

(65) Prior Publication Data

US 2010/0087967 A1 Apr. 8, 2010

(51) Int. Cl.
- H01Q 1/28 (2006.01)
- G01C 23/00 (2006.01)
- G01S 13/00 (2006.01)

(52) U.S. Cl. .............. 342/29; 701/3; 343/705
(58) Field of Classification Search .......... 342/70–72; 701/1–18, 223; 343/705–708, 711–718
See application file for complete search history.

(56) References Cited

U.S. PATENT DOCUMENTS

| | | | |
|---|---|---|---|
| 3,114,147 A | | 12/1963 | Kuecken |
| 3,728,727 A | | 4/1973 | Botwin et al. |
| 3,961,321 A | * | 6/1976 | Moss ................. 367/93 |
| 3,986,182 A | * | 10/1976 | Hackett ............. 340/525 |
| 4,027,307 A | * | 5/1977 | Litchford ............ 342/32 |
| 4,319,242 A | * | 3/1982 | Lewis ................. 342/67 |
| 4,339,755 A | | 7/1982 | Wright |
| 4,403,220 A | * | 9/1983 | Donovan ............. 342/29 |
| 4,442,431 A | * | 4/1984 | Bleakney ............. 342/62 |
| 4,755,818 A | * | 7/1988 | Conrad .............. 340/961 |
| 4,855,748 A | * | 8/1989 | Brandao et al. ....... 342/455 |
| 5,057,833 A | * | 10/1991 | Carlson .............. 340/961 |
| 5,097,267 A | | 3/1992 | Raviv |
| 5,111,210 A | * | 5/1992 | Morse .............. 342/455 |
| 5,296,909 A | | 3/1994 | Fazi et al. |

(Continued)

FOREIGN PATENT DOCUMENTS

DE  3740142  6/1989

(Continued)

OTHER PUBLICATIONS

Sarabandi, Kamal, "Millimeter-Wave Radar Phenomenology of Power Lines and a Polarimetric Detection Algorithm", "IEEE Transactions on Antennas and Propagation", Dec. 1999, pp. 1807-, vol. 47, No. 12, Publisher: IEEE, Published in: US.

(Continued)

Primary Examiner—Thomas H Tarcza
Assistant Examiner—Peter Bythrow
(74) Attorney, Agent, or Firm—Fogg & Powers LLC (57) ABSTRACT

A radar system comprises a plurality of antenna sub-systems, each operable to transmit and receive radio frequency (RF) signals in a corresponding sector, wherein the plurality of antenna sub-systems are positioned such that the corresponding sectors cover a total range of about 180 degrees to about 360 degrees without rotation of the radar system. The radar system also comprises shared backend circuitry coupled to each of the plurality of antenna sub-systems and operable to process signals from each of the plurality of antenna sub-systems to detect the presence of an obstacle in one of the corresponding sectors.

13 Claims, 6 Drawing Sheets

U.S. PATENT DOCUMENTS

| | | | |
|---|---|---|---|
| 5,321,489 A * | 6/1994 | Defour et al. | 356/4.01 |
| 5,351,032 A | 9/1994 | Latorre et al. | |
| 5,451,957 A * | 9/1995 | Klausing | 342/25 F |
| 5,529,138 A * | 6/1996 | Shaw et al. | 180/169 |
| 5,712,640 A * | 1/1998 | Andou et al. | 342/70 |
| 5,717,399 A * | 2/1998 | Urabe et al. | 342/70 |
| 5,940,011 A * | 8/1999 | Agravante et al. | 340/903 |
| 6,054,947 A | 4/2000 | Kosowsky | |
| 6,211,808 B1 * | 4/2001 | Rees | 342/29 |
| 6,400,308 B1 * | 6/2002 | Bell et al. | 342/71 |
| 6,636,177 B1 * | 10/2003 | Scholz | 342/368 |
| 6,727,841 B1 * | 4/2004 | Mitra | 342/25 R |
| 6,738,009 B1 | 5/2004 | Tsunoda | |
| 6,822,612 B2 * | 11/2004 | Takimoto et al. | 343/713 |
| 6,856,279 B2 | 2/2005 | Hager et al. | |
| 6,933,900 B2 * | 8/2005 | Kitamori et al. | 343/713 |
| 6,987,492 B1 * | 1/2006 | Buchanan et al. | 343/882 |
| 7,167,126 B2 | 1/2007 | Wittenberg et al. | |
| 7,307,579 B2 * | 12/2007 | Rees et al. | 342/29 |
| 7,379,017 B2 | 5/2008 | Dwelly et al. | |
| 7,443,334 B2 * | 10/2008 | Rees et al. | 342/29 |
| 7,598,646 B2 | 10/2009 | Cleveland | |
| 7,692,575 B2 * | 4/2010 | Nishimura | 342/147 |
| 2007/0018882 A1 * | 1/2007 | Manoogian et al. | 342/80 |
| 2007/0152814 A1 | 7/2007 | Stefani | |
| 2007/0252748 A1 * | 11/2007 | Rees et al. | 342/29 |
| 2008/0055149 A1 * | 3/2008 | Rees et al. | 342/29 |
| 2008/0169962 A1 * | 7/2008 | Rees et al. | 342/29 |

FOREIGN PATENT DOCUMENTS

| | | |
|---|---|---|
| EP | 1391748 | 2/2004 |
| WO | 2006124063 | 11/2006 |
| WO | WO 2006124063 A2 * | 11/2006 |

OTHER PUBLICATIONS

UK Intellectual Property Office, "International Search Report", Jan. 27, 2010, Published in: GB.

* cited by examiner

MULTI-SECTOR RADAR SENSOR

CROSS-REFERENCE TO RELATED APPLICATIONS

This application is related to co-pending U.S. patent application Ser. No. 12/245,334, filed on even date herewith and entitled "Radar System for Obstacle Avoidance", hereby incorporated herein by reference, and referred to herein as the "'377 Application".

BACKGROUND

Unmanned-aircraft Systems (UAS) flying under the National Airspace System (NAS) need to operate with the same obstacle detection and avoidance capabilities as a piloted vehicle. In particular, UASs operate under the same instrument flight rules for manned vehicles as Instrument Meteorological Conditions (IMC) and Visual Meteorological Conditions (VMC) allow under the NAS. Hence, UASs must possess equivalent sensing and reaction performance capabilities of piloted vehicles.

One technique of providing a necessary field of view (FOV) for a UAS is to use a two-gimbaled radar system. A two-gimbaled radar system rotates along the azimuth angle and the elevation angle in a raster scan motion. However, this raster scan motion causes delay in the update rate. In particular, at each end of the field of view, the gimbaled radar system slows, comes to a stop, and begins moving in the opposite direction at a new elevation angle. Delay in the update rate can result in a delayed reaction to obstacles in the vehicles path.

For the reasons stated above and for other reasons which shall become apparent to one of ordinary skill in the art upon reading and studying the present application, there is a need in the art for an improved radar system with a faster update rate.

SUMMARY

The above mentioned problems and other problems are resolved by the embodiments described herein and will be understood by reading and studying the following specification.

In one embodiment a radar system is provided. The radar system comprises a plurality of antenna sub-systems, each operable to transmit and receive radio frequency (RF) signals in a corresponding sector, wherein the plurality of antenna sub-systems are positioned such that the corresponding sectors cover a total range of about 180 degrees to about 360 degrees without rotation of the radar system. The radar system also comprises shared backend circuitry coupled to each of the plurality of antenna sub-systems and operable to process signals from each of the plurality of antenna sub-systems to detect the presence of an obstacle in one of the corresponding sectors.

DRAWINGS

Understanding that the drawings depict only exemplary embodiments and are not therefore to be considered limiting in scope, the embodiments will be described with additional specificity and detail through the use of the accompanying drawings, in which.

In accordance with common practice, the various described features are not drawn to scale but are drawn to emphasize specific features relevant to the embodiments described herein. Like reference numbers and designations in the various drawings indicate like elements.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the embodiments described herein. Furthermore, the method presented in the drawing figures or the specification is not to be construed as limiting the order in which the individual steps may be performed. The following detailed description is, therefore, not to be taken in a limiting sense.

Figure 1:
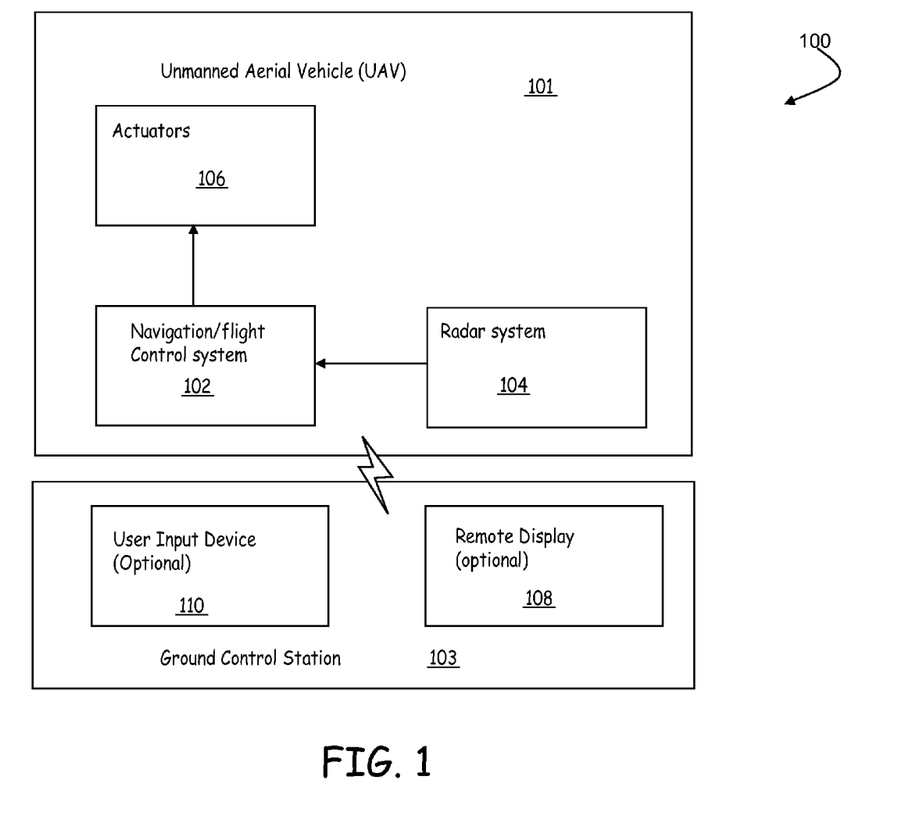
FIG. 1 is a block diagram depicting one embodiment of an unmanned aircraft system.

FIG. 1 is a block diagram depicting one embodiment of an unmanned aircraft system (UAS) 100. UAS 100 includes an unmanned aerial vehicle (UAV) 101 and optionally ground control station 103. UAV 101 includes a navigation system 102 and a radar system 104. Radar system 104 detects the presence of obstacles near the unmanned vehicle 100. In particular, radar system 104 scans a plurality of sectors without rotating as described in more detail below. Hence, the update rate for radar system 104 is faster than two-gimbaled radar systems which move in a raster scan motion.

Radar system 104 provides the obstacle data to navigation system 102. Navigation system 102 controls operation of actuators 106 in order to avoid detected obstacles. For example, actuators 106 include, but are not limited to, wing flaps and throttle in an aerial vehicle. Navigation system 102 adjusts the heading and speed of vehicle 100 via the actuators 106 to avoid detected obstacles.

In addition, in some embodiments, radar system 104 provides the obstacle data to a remote display 108 in ground control station 103 via a wireless radio frequency (RF) signal. Remote display 108 is located in a remote location where a user can remotely control the unmanned vehicle. Remote display 108 displays the obstacle data to a remote user located in ground control station 103. The remote user can provide commands to navigation system 102 via a remote user input device 110 which is coupled to the navigation system 102 via an RF signal. In response to the commands received from remote user input device 110, navigation system 102 controls the operation of actuators 106 to avoid the detected obstacles.

Figure 2:
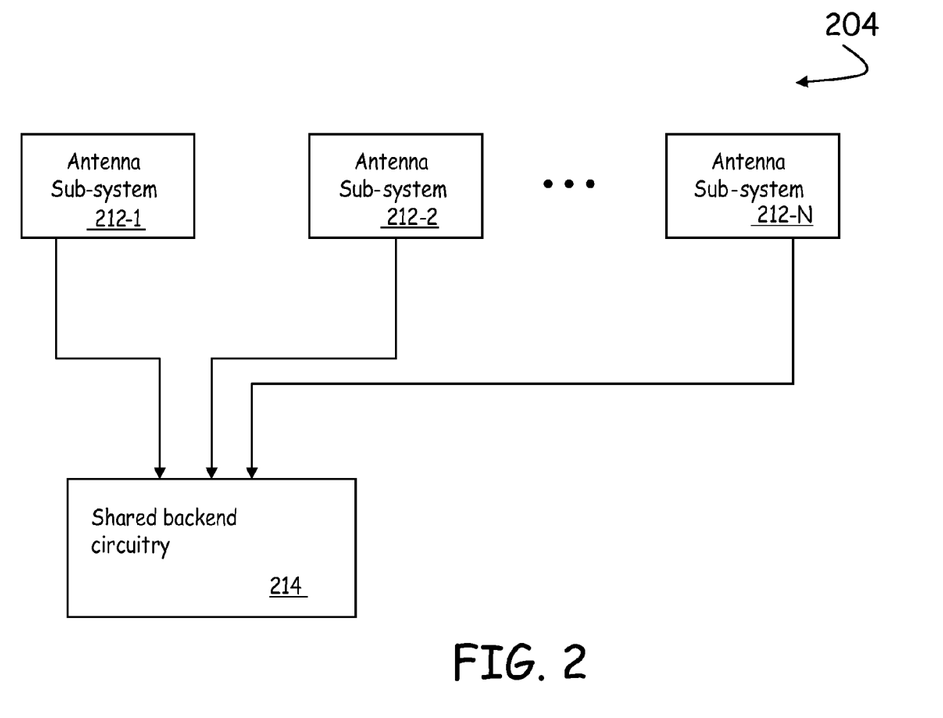
FIG. 2 is a block diagram of one embodiment of a radar system.

FIG. 2 is a block diagram showing details of an exemplary radar system 204, which corresponds to radar system 104, according to one embodiment of the present invention. Radar system 204 can be implemented in an unmanned vehicle such as unmanned vehicle 100 discussed above. Radar system 204 includes a plurality of antenna sub-systems 212-1 . . . 212-N. Each of the plurality of antenna sub-systems 212 scans a corresponding sector using techniques known to one of ordinary skill in the art. Adjacent antenna sub-systems 212 scan adjacent areas such that the total area scanned provides the necessary field of view for safe maneuvering of the unmanned vehicle. The necessary field of view is dictated, at least in part, by the type of vehicle used. For example, in embodiments implementing an aerial vehicle, regulations require that the vehicle scan an area that ranges at least 110 degrees in front of the vehicle.

Each of the plurality of antenna sub-systems 212 is coupled to shared backend circuitry 214. Shared backend circuitry 214 processes the data received by each of the antenna sub-systems 212. In particular, shared backend circuitry 214 converts the millimeter wave (MMW) signals received by each of the antenna sub-systems 212 into an intermediate frequency (IF) signal and analyzes the IF signals to identify obstacles in the sector corresponding to the IF signals. In addition, shared backend circuitry 214 controls the transmission frequency and modulation of the MMW signals transmitted by each of the plurality of antenna sub-systems 212. By using shared backend circuitry 214, the size, weight, and power consumption of radar system 204 are reduced as compared to replicating the backend circuitry for each of the plurality of antenna sub-systems 212.

Figure 3:
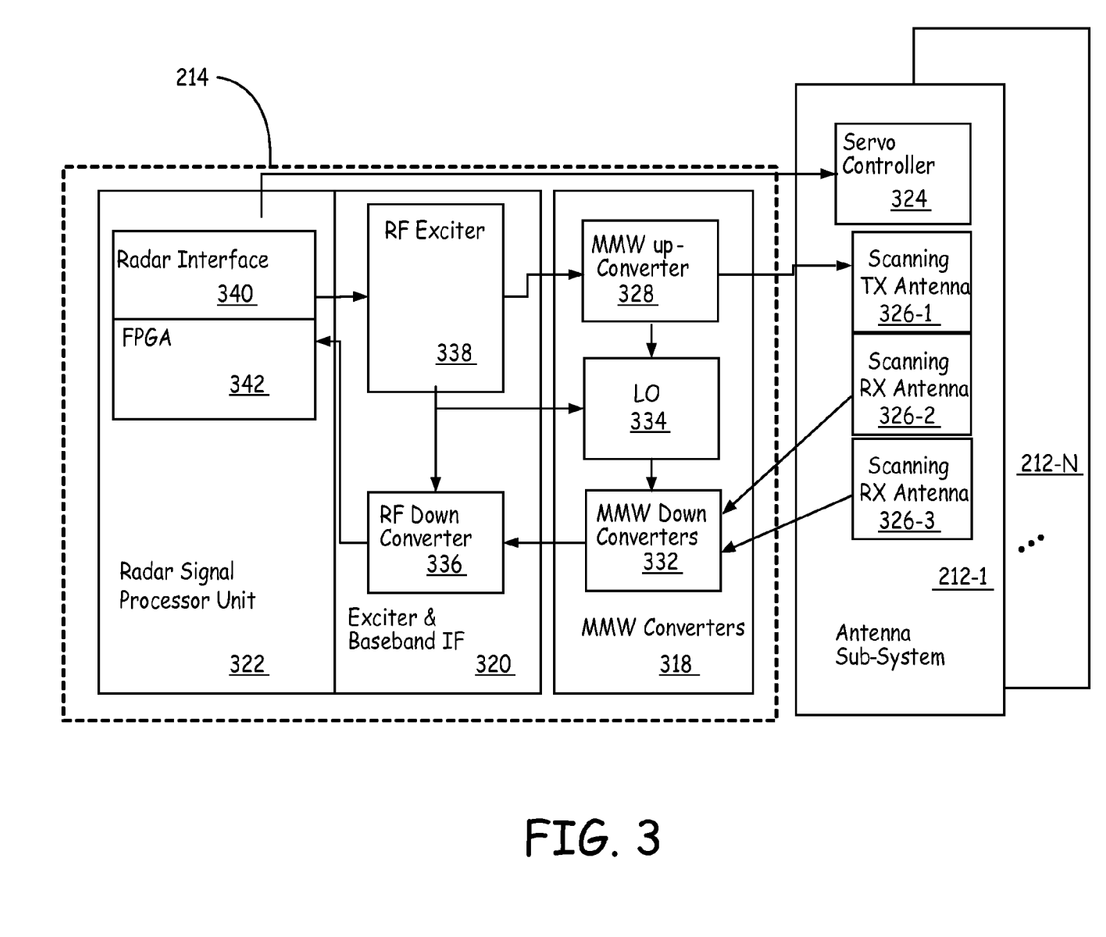
FIG. 3 is a block diagram of one embodiment of shared backend circuitry in a radar system.

One exemplary embodiment of shared backend circuitry 214 is shown in FIG. 3. The shared backend circuitry 214, includes a millimeter wave converter 318, an exciter and baseband IF circuit 320, and a radar signal processor unit 322. Shared backend circuitry 214 shown in FIG. 3 is coupled to each of antenna sub-systems 212-1 to 212-N. Each antenna sub-system 212 includes a servo controller 324 and at least one scanning antenna 326. In the embodiment shown in FIG. 3, each antenna sub-system includes one transmit antenna 321-1 and two receive antennae 326-2 and 326-3. The scanning antennae are implemented as feed horn or sub-reflector antennae in this embodiment.

Servo controller 324 controls the scanning motion of the scanning antennae 326-1 to 326-3. In addition, servo controller 324 is coupled to a radar interface 340 of radar signal processing unit 322. Radar signal processing unit 322 provides control signals to servo controller 324 to control the scanning motion of the scanning antennae 326-1 to 326-3.

Millimeter wave converter 318 includes a MMW down-converter 332, MMW up-converter 328, and a local oscillator (LO) 334. MMW down-converter 332 mixes a local oscillator (LO) signal with the radar returns from the receive antennae 326-2 and 326-3 to produce a lower frequency RF signal. The lower frequency RF signal is then down-converted to an intermediate frequency (IF) in an RF down-converter 336 located in baseband IF circuit 320. Similarly, MMW up-converter 328 up-converts an RF signal from RF exciter 338 to a MMW signal for transmission from scanning transmit antenna 326-1.

The down-converter IF signal from RF down-converter 336 is processed in radar signal processor unit 322. In particular, in this embodiment, radar signal processor unit 322 is implemented with a field programmable gate array (FPGA) 342 which analyzes the data in the IF signal to detect the presence of obstacles in one or more scanned sectors using techniques known to one of skill in the art. In addition, as shown in FIG. 4C, the two receiver antennae 326-2 and 326-3 (labeled A and B in FIG. 4C) in each antenna sub-systems 212 are separated by a known separation distance and are synchronized to scan the sector together. In particular, radar signal processor unit 322 controls the scanning motion of receiver antennae 326-2 and 326-3 in each antenna sub-system 212 such that the scanning motion is synchronized. In such embodiments, FPGA 342 determines the elevation angle to detected obstacles based on the relative phase of the reflected signals received by each of the two receiver antennae 326-2 and 326-3.

Figure 5A:
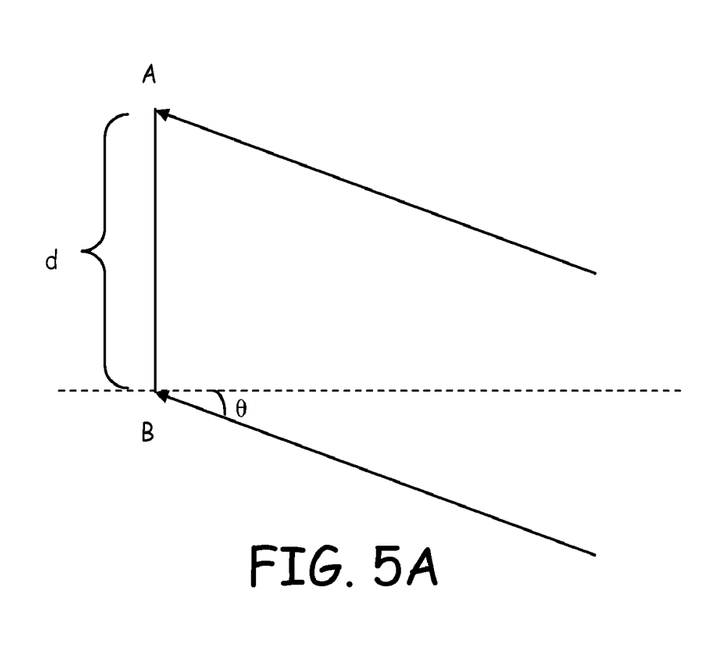
FIGS. 5A-5B depict the relative angle and phase difference of reflected signals received by one embodiment of a radar system.
Figure 5B:
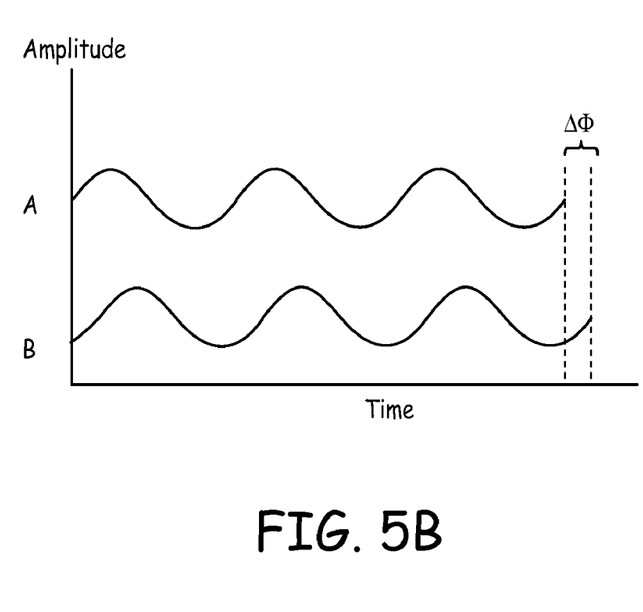

As shown in FIG. 5A, a reflected signal is received at each receiver antenna A and B. The elevation angle θ is the angle of incidence at which the reflected signal arrives at antennae A and B. Due to the separation distance, d, between receiver antennae A and B, the reflected signal received at receiver antenna A will be out of phase, by a phase difference ΔΦ, with the reflected signal received at receiver antenna B, as shown in FIG. 5B. The following equation expresses the elevation angle θ in terms of the phase difference ΔΦ and the separation distance d.

$$\theta = \sin^{-1}\left(\frac{\lambda \Delta \phi}{2\pi d}\right)$$

The wavelength λ and separation distance d are both known by the FPGA 342. In addition, FPGA 342 measures the phase difference ΔΦ and then calculates the elevation angle θ to determine the vertical position of the detected obstacles.

Figure 4A:
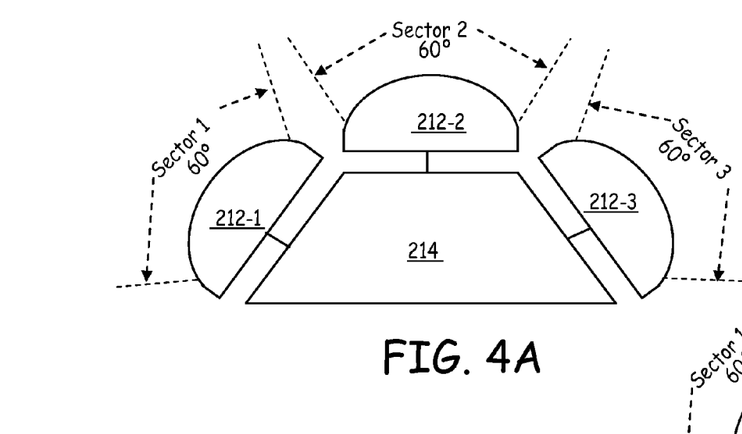
FIGS. 4A-4C depict exemplary configurations of a radar system.
Figure 4B:
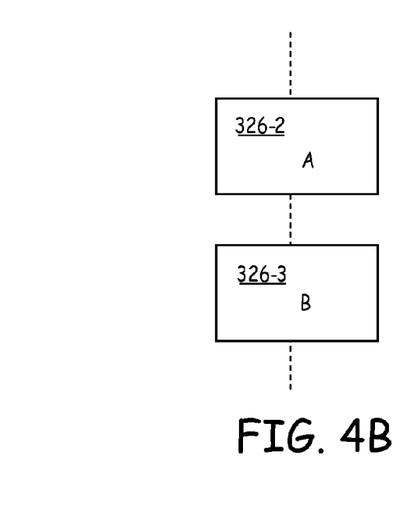
Figure 4C:
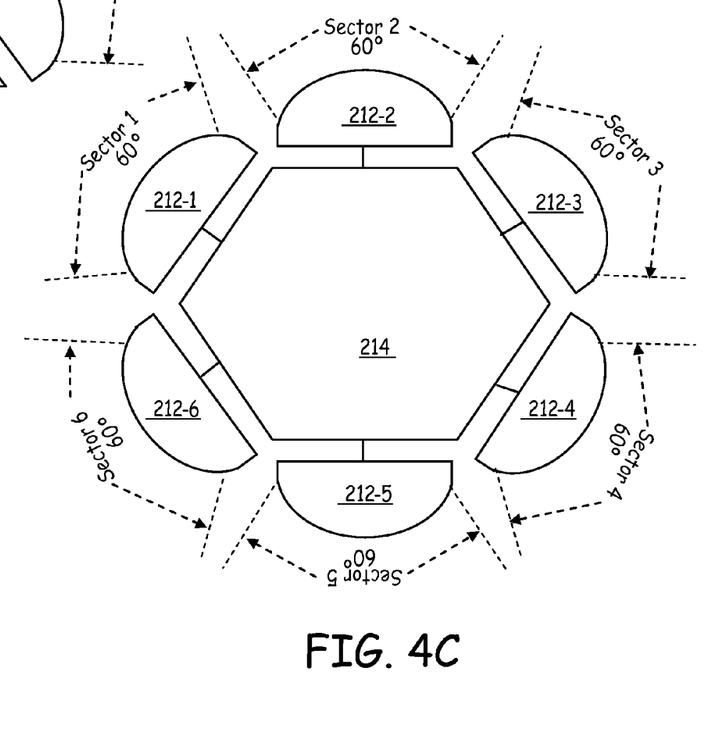

Exemplary configurations of antenna sub-systems 212 are shown in FIGS. 4A and 4B. As shown in FIG. 4A, antenna sub-systems 212 are positioned to scan adjacent sectors. In the embodiment shown in FIG. 4A, each of sectors 1, 2, and 3 extends approximately 60 degrees such that the total area scanned is approximately 180 degrees. However, in some embodiments, each antenna sub-system 212 scans a sector covering approximately 30 degrees. In some such embodiments, six antenna sub-systems are used to scan a total area of approximately 180 degrees. In addition, in some embodiments, the sector scanned by each antenna sub-systems 212 slightly overlaps the sectors scanned by adjacent antenna sub-systems 212

Additionally, in other embodiments, as shown in FIG. 4B, six antenna sub-systems 212, each scanning approximately 60 degree sectors (1-6), are used to scan a total area of approximately 360 degrees. It is to be understood that the embodiments shown in FIGS. 4A and 4B are provided by way of example and not by way of limitation. In particular, any appropriate number of antenna sub-systems can be used. For example, in some embodiments, each antenna sub-system can be configured to scan sectors of different sizes, such as 45 degree sectors (i.e., a sector which extends 45 degrees from end to end, the sector centered on the corresponding antenna sub-system).

Figure 6:
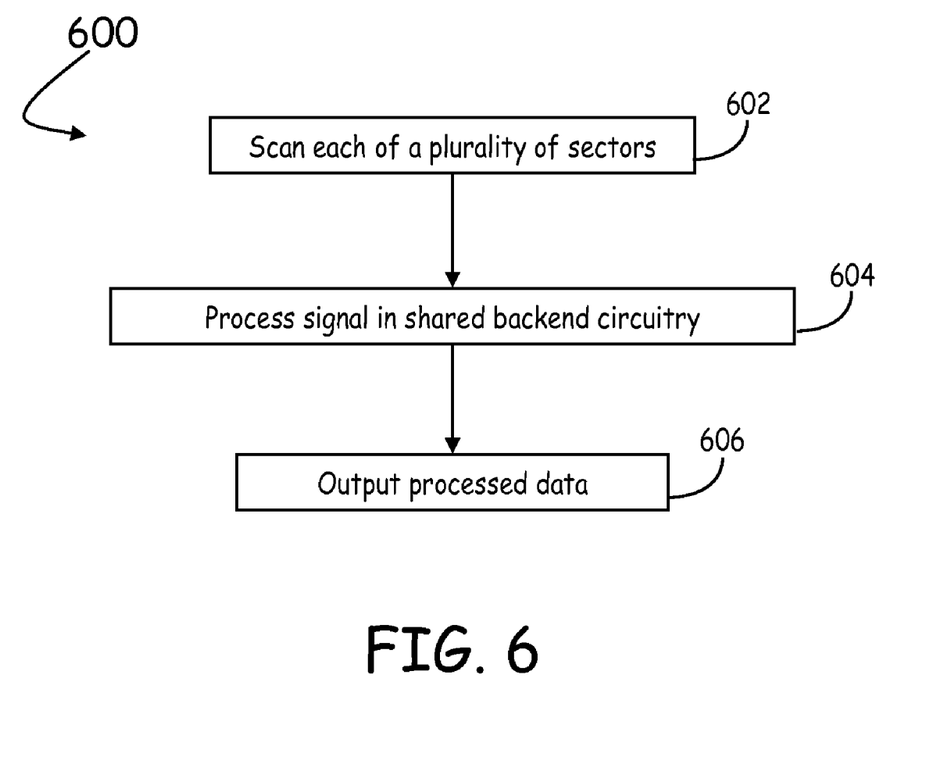
FIG. 6 is a flow chart depicting one embodiment of a method of detecting obstacles with a radar system.

FIG. 6 is a flow chart depicting a method 600 of detecting obstacles with a non-rotating radar system. At 602, each of a plurality of sectors is scanned by at least one antenna sub-system without rotating the radar system. In particular, in some embodiments, each antenna sub-system includes two receive antennae which are synchronized to scan the corresponding sector. Since the same motor drive controller is used for each sector, the two receive antenna are thereby synchronized. The two receive antennae are separated by a known vertical distance as described above. At 604, signals from each antenna sub-system are processed by shared backend circuitry as described above. Processing signals with shared backend circuitry reduces the size, weight and power consumption of the radar system in comparison to processing each received reflected separate circuitry. In addition, in some embodiments, processing the signals comprises determining the elevation angle of detected obstacles based on the phase difference between signals received at each of the two receive antennae corresponding to the sector in which the obstacle is detected as described above. At 606, the processed data identifying the detected obstacles is output. For example, in some embodiments, the data is output to a remote display unit such that a remote user is able to control the vehicle in order to avoid the obstacles. In other embodiments, the data is output to a local display unit to provide the data to a pilot or remote user of the vehicle. In yet other embodiments, the data is output directly to a navigation system which controls movement of an unmanned vehicle based on the received radar data.

All or some portions of method 600 can be implemented in software instructions tangibly embodied on a computer readable medium and executed by a processing unit such as radar processing circuitry 214. Such computer readable media can be any available media that can be accessed by a general purpose or special purpose computer or processor, or any programmable logic device. Suitable computer readable media may include storage or memory media such as magnetic or optical media, e.g., disk or CD-ROM, volatile or non-volatile media such as RAM (e.g. SDRAM, DDR SDRAM, RDRAM, SRAM, etc.), ROM, EEPROM, flash memory, etc. as well as transmission media such as electrical, electromagnetic, or digital signals, conveyed via a communication medium such as a network and/or a wireless link.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A radar system comprising:
a plurality of antenna sub-systems, each operable to transmit and receive radio frequency (RF) signals in a corresponding sector, wherein the plurality of antenna sub-systems are positioned such that the corresponding sectors cover a total range of about 180 degrees to about 360 degrees without rotation of the radar system; and
shared backend circuitry coupled to each of the plurality of antenna sub-systems and operable to process signals from each of the plurality of antenna sub-systems to detect the presence of an obstacle in one of the corresponding sectors;
wherein each of the plurality of antenna sub-systems comprises:
a scanning transmit antenna;
two scanning receive antennae separated by a vertical distance; and
a servo controller configured to control a scanning motion of the scanning transmit antenna and the two scanning receive antennae based on control signals received from the shared backend circuitry;
wherein the servo controller is configured to control the scanning motion of the two scanning receive antennae such that the scanning motion is synchronized; and
wherein the shared backend circuitry is configured to determine the elevation of the detected obstacles based on a phase difference between signals received by each of the two scanning receive antennae.

2. The radar system of claim 1, wherein the plurality of antenna sub-systems comprises three to twelve antenna sub-systems.

3. The radar system of claim 1, wherein each of the plurality of antenna sub-systems corresponds to a sector that covers a range of about 30 degrees to about 60 degrees.

4. The radar system of claim 1, wherein the plurality of antenna sub-systems are operable to transmit and receive RF signals in the millimeter wave frequency range.

5. The radar system of claim 1, wherein the shared backend circuitry comprises:
a down-converter operable to down-convert received RF signals from the plurality of antenna sub-systems to an intermediate frequency (IF);
an up-converter operable to up-convert signals for transmission from an IF frequency to an RF frequency; and
a radar signal processor unit operable to determine the location of obstacles based on the IF signals from the down-converter.

6. An unmanned vehicle comprising:
a radar system operable to detect obstacles near the unmanned vehicle, wherein the radar system comprises:
a plurality of antenna sub-systems, each operable to transmit and receive radio frequency (RF) signals in a corresponding sector, wherein the plurality of antenna sub-systems are positioned such that the corresponding sectors cover a total range of about 180 degrees to about 360 degrees without rotation of the radar system; and
shared backend circuitry coupled to each of the plurality of antenna sub-systems and operable to process signals from each of the plurality of antenna sub-systems to detect the presence of an obstacle in one of the corresponding sectors; and
a navigation system operable to control movement of the unmanned vehicle based, at least in part, on the detection of obstacles by the radar system;
wherein each of the plurality of antenna sub-systems comprises:
a scanning transmit antenna;
two scanning receive antennae separated by a vertical distance; and
a servo controller configured to control a scanning motion of the scanning transmit antenna and the at least one scanning receive antenna based on control signals received from the shared backend circuitry;
wherein the servo controller is configured to control the scanning motion of the two scanning receive antennae such that the scanning motion is synchronized.

7. The unmanned vehicle of claim 6, wherein the plurality of antenna sub-systems comprises three to twelve antenna sub-systems.

8. The unmanned vehicle of claim 6, wherein each of the plurality of antenna sub-systems corresponds to a sector that covers a range of about 30 degrees to about 60 degrees.

9. The unmanned vehicle of claim 6, wherein the plurality of antenna sub-systems are operable to transmit and receive RF signals in the millimeter wave frequency range.

10. The unmanned vehicle of claim 6, wherein the unmanned vehicle comprises one of an unmanned aerial vehicle, an unmanned ground vehicle and an unmanned lunar lander.

11. The unmanned vehicle of claim 6, wherein the shared backend circuitry comprises:
a down-converter operable to down-convert received RF signals from the plurality of antenna sub-systems to an intermediate frequency (IF);
an up-converter operable to up-convert signals for transmission from an IF frequency to an RF frequency; and a radar signal processor unit operable to determine the location of obstacles based on the IF signals from the down-converter.

12. The unmanned vehicle of claim 6, further comprising:

a remote display operable to display data regarding detected obstacles received from the radar system to a remote user; and a user input device operable to provide commands to the navigation system from a user in a remote location.

13. A method of detecting obstacles with a radar system, the method comprising:

scanning each of a plurality of sectors without rotating the radar system, each sector scanned by at least one antenna sub-system comprising a scanning transmit antenna and two scanning receive antennae moving in a scanning motion within the corresponding sector, the two scanning receive antennae in each antenna sub-system separated by a vertical distance;

processing reflected signals received by each antenna sub-system with shared backend circuitry to detect the presence of obstacles in one or more of the plurality of sectors; and outputting data regarding detected obstacles;

wherein processing the reflected signals with the shared backend circuitry includes determining an elevation angle of detected obstacles based on a phase difference between signals received at each of the two scanning receive antennae corresponding to the sector in which the detected obstacles are detected.

* * * * *